(12) United States Patent
Remy

(10) Patent No.: US 10,066,487 B2
(45) Date of Patent: Sep. 4, 2018

(54) DRUM BLADE LOCK IN A CIRCUMFERENTIAL ROTOR GROOVE

(71) Applicant: Techspace Aero S.A., Herstal (BE)

(72) Inventor: Christophe Remy, Fexhe-le-Haut-Clocher (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 942 days.

(21) Appl. No.: 14/051,852

(22) Filed: Oct. 11, 2013

(65) Prior Publication Data

US 2014/0105748 A1 Apr. 17, 2014

(30) Foreign Application Priority Data

Oct. 12, 2012 (EP) ..................................... 12188423

(51) Int. Cl.
*F01D 5/14* (2006.01)
*F01D 5/30* (2006.01)
*F01D 5/32* (2006.01)

(52) U.S. Cl.
CPC ............. *F01D 5/14* (2013.01); *F01D 5/3038* (2013.01); *F01D 5/32* (2013.01); *Y02T 50/671* (2013.01)

(58) Field of Classification Search
CPC .......... F01D 5/30; F01D 5/303; F01D 5/3038; F01D 5/3053; F01D 5/32
USPC ............................................ 416/215, 220 R
See application file for complete search history.

(56) References Cited

U.S. PATENT DOCUMENTS 3,216,700 A * 11/1965 Bostock, Jr. .......... F01D 5/3038
416/216
6,279,420 B1 * 8/2001 Knorowski ............. B25B 13/48
409/141
6,464,463 B2 * 10/2002 Yvon Goga ................ F01D 5/32
416/215

(Continued)

FOREIGN PATENT DOCUMENTS

EP 1314856 A1 5/2003
EP 1801355 A1 6/2007

(Continued)

OTHER PUBLICATIONS

Search Report dated Mar. 13, 2013 for EP 12188423.

*Primary Examiner* — Richard Edgar
*Assistant Examiner* — John S Hunter
(74) *Attorney, Agent, or Firm* — James E. Walton

(57) ABSTRACT

The subject application relates to blade root wedging lock in a circumferential groove in a rotor such as the drum of an axial turbomachine compressor. The body (32) of the lock includes a solid portion (38) designed to be housed in the groove and having two opposite bearing surfaces (40) and at least one circumferential wedging surface (42). The body (32) further includes an upper portion (36) in the shape of an elongated generally vertical chamber designed to be flush with the upper surfaces of the platforms of adjacent blades when the lock is correctly positioned. This chamber (36) is truncated (44) so as to reduce its length in a direction perpendicular to the circumference, corresponding to the axis of rotation of the rotor. The lock can thus be accommodated in a narrow groove without decreasing the diameter of the clamping screw passing through the hole (34). The subject application also relates to a rotor and a turbomachine equipped with the lock.

13 Claims, 4 Drawing Sheets

(56) References Cited

U.S. PATENT DOCUMENTS

| | | | | |
|---|---|---|---|---|
| 6,752,598 B2* | 6/2004 | Antunes | ............... | F01D 5/32 |
| | | | | 416/215 |
| 6,981,847 B2* | 1/2006 | Arinci | ............... | F01D 5/32 |
| | | | | 416/193 A |
| 2007/0014667 A1* | 1/2007 | Pickens | ............... | F01D 5/3038 |
| | | | | 416/193 A |

FOREIGN PATENT DOCUMENTS

| | | |
|---|---|---|
| EP | 2333243 A2 | 6/2011 |
| FR | 2886336 A1 | 12/2006 |
| FR | 2973067 A1 | 9/2012 |
| GB | 639320 A | 6/1950 |

* cited by examiner

DRUM BLADE LOCK IN A CIRCUMFERENTIAL ROTOR GROOVE

This application claims priority under 35 U.S.C. § 119 to European Patent Application No. 12188423.3, filed 12 Oct. 2012, which is incorporated herein by reference for all purposes.

BACKGROUND

1. Field of the Application

The subject application relates to a bladed wheel of an axial turbomachine. More particularly, the subject application relates to the problem of locking or clamping the blades in a circumferential groove of a rotor. More particularly, the subject application relates to a blade clamping lock in such a groove.

2. Description of Related Art

Patent EP 1801355 A1 shows a lock for clamping the blades in a circumferential groove. The problem addressed in this document is the positioning of such a lock, particularly in one or more of the downstream stages of the low-pressure compressor of a jet engine. In fact, due to the inclined slope of this part of the drum's shell, the axis of the screw is generally inclined relative to the mean plane of the lock so as to be generally perpendicular to the axis of rotation of the drum. This consequence of this construction is that the lock can position itself poorly when tightening the screw. The disclosed solution is essentially to provide a rotational support surface about which the lock can be pivoted in a radial plane in order to position itself.

Patent FR 2886336 A1 relates to a blade clamping lock, similar to that in the previous document. It addresses the problem of holding the lock in the recess or circumferential groove of a compressor drum. The lock described therein includes front and rear support surfaces with respective bosses designed to prevent the lock from sliding circumferentially.

Patent GB 639320 discloses a blade clamping lock in a circumferential groove in a compressor rotor. Although the lock has two screws spread across the length of the lock, this document does not seem to address the issue of adjusting the tightening forces on each screw, or the problem of bulkiness.

Patent US 2011/0116933 A1 relates also to clamping blades in a circumferential groove in a compressor drum using locks. The particularity of this interpretation lies in only one of the two lips of the groove having slots. Therefore, the lock has a correspondingly designed shape, namely a rounded shape towards the lip of the groove having slots and a straight shape on the opposite lip.

In some of the interpretations mentioned above, the lock comprises an elongated generally vertical chamber through which there is a hole through which the clamping screw is inserted. The upper edge of this chamber is sized to be aligned with the outer surfaces of adjacent platforms of the blades when the lock is in position. This chamber provides an easy and reliable way of visually checking the correct positioning of the lock while it is being tightened.

Although great strides have been made in the area of drum blade locks, many shortcomings remain.

DETAILED DESCRIPTION OF THE PREFERRED EMBODIMENT

Figure 1:
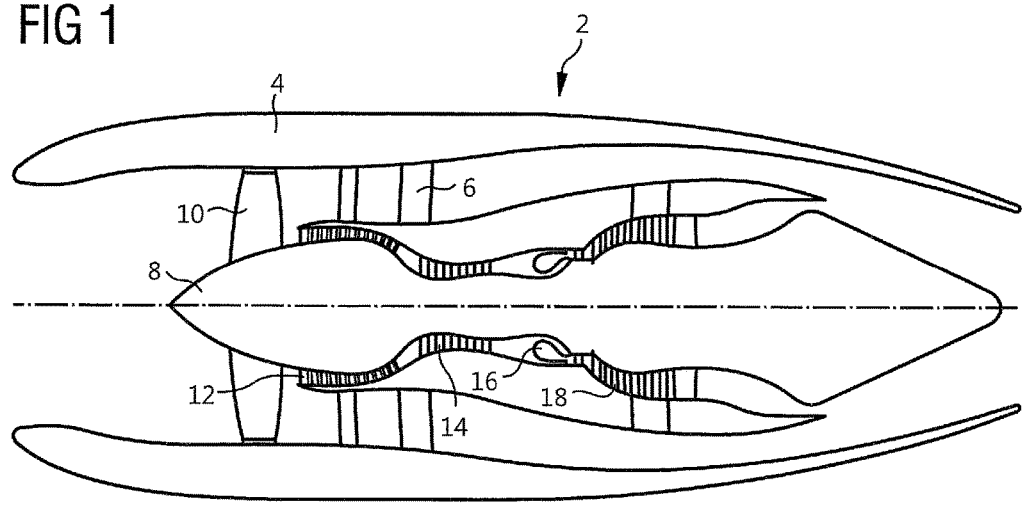
FIG. 1 is a schematic sectional view of an axial turbomachine of a jet engine, comprising a compressor with a bladed rotor in accordance with the subject application.

In the search for compactness and reducing the weight of a turbine engine, it may be necessary to reduce the width of the circumferential grooves housing the blade roots. In this event, the locks used heretofore cannot be inserted into the grooves. For mechanical and safety reasons, a minimum screw diameter is set. It is thus difficult to reduce the size of the locks.

The subject application aims to propose a solution to reduce and/or shorten the bladed rotor of an axial turbomachine. More particularly, the subject application aims to provide a more compact lock.

The subject application relates to a lock for a blade root housed in a circumferential rotor groove having opposite sides each with a hollow profile, the lock comprising: a body with two opposed bearing surfaces designed to bear radially on the opposite hollow faces of the groove; a through hole between the two bearing surfaces extending along an axis and designed to house a clamping screw; an upper part, preferably cylindrical, pierced by the hole; notable in that the upper part is truncated so as to allow a reduction in its length in a plane generally perpendicular to the axis of the hole.

According to an advantageous embodiment of the subject application, the upper part is truncated so as to allow a reduction of its length along the width of the groove; that is to say in a direction corresponding to the width of the groove.

According to an advantageous embodiment of the subject application, the upper part is truncated so as to allow a reduction of its length in a direction corresponding generally to the circumferential direction of the groove. More specifically, the reduction in length is in a direction generally perpendicular to the mean chord of the attached blades.

The cross section of the groove may have a generally hexagonal cross section.

The section of the upper part of the lock body can be circular, polygonal, or any other form generally corresponding to part of a ring. The fact that it is truncated results in the profile of the section being open and not closed. The fact remains that the initial general shape is still recognizable.

The longitudinal direction of the lock is in a radial plane of the rotor when the lock is fitted in the groove.

According to an advantageous embodiment of the subject application, the upper truncated part of the body is truncated at least on its upper part along a longitudinal plane of the groove, and preferably on its lower part following a developable surface.

According to an advantageous embodiment of the subject application, the upper truncated part of the body is truncated for a distance along its section of between ¼ and ½ of its average outside diameter.

According to an advantageous embodiment of the subject application, the hole comprises a threaded part at a distance from the upper edge of the upper truncated part of the body so as to allow the clamping screw, when it is engaged in the thread, to have its head at a level below the said upper edge.

According to an advantageous embodiment of the subject application, the body comprises at least one wedge-shaped surface designed to mate with a corresponding slot on one of opposite sides of the groove.

According to an advantageous embodiment of the subject application, the lock comprises the clamping screw mating with a thread in the hole of the body, the said screw having a head with a diameter larger than the threaded part of the screw, the said screw and the said thread of the body being made such that the screw can take a position where its head is embedded in the cylindrical upper part to a level beneath that of the upper edge of the said part.

According to an advantageous embodiment of the subject application, the body comprises a solid part, preferably with a longitudinal section in the general shape of an inverted T, the truncated upper part of the body being attached directly on the said solid part, the truncation being limited to the cylindrical upper part.

According to an advantageous embodiment of the subject application, the shape of the hole at the truncated part of the upper part of the body is essentially the same as the corresponding edge of the solid part.

According to an advantageous embodiment of the subject application, the longitudinal axis of the hole is located predominantly on one side of a transverse median plane of the body.

According to an advantageous embodiment of the subject application, the upper part is truncated on two opposite sides.

According to an advantageous embodiment of the subject application, the upper part of the body is truncated at least on its upper part along a plane transverse to the groove. The transverse plane is preferably inclined relative to a plane perpendicular to the groove.

The subject application also relates to an axial turbomachine wheel, comprising: a rotor with at least one circumferential groove having opposite sides each having a hollow profile; blades with roots that are housed in, and mechanically held by, the groove; at least one lock mounted in the groove between the roots of two adjacent blades, preventing the blades from sliding along the groove; wherein the lock is in accordance with the subject application, the clamping screw bearing on the bottom of the groove.

According to an advantageous embodiment of the subject application, the two adjacent blades on either side of the lock each include a platform on their adjacent edges that have cut-outs that follow the contour of the corresponding half of the truncated upper part of the body of the lock.

According to an advantageous embodiment of the subject application, the profile of the cut-outs on the platforms includes a first circular part of more than 90° and a second straight part generally perpendicular to the edge of the cut-out.

According to an advantageous embodiment of the subject application, part of the screw head is hidden under the two adjacent platforms.

According to an advantageous embodiment of the subject application, the longitudinal axis of the hole is essentially in a median plane of the platforms passing between the adjacent edges.

The subject application also relates to an axial turbomachine compressor comprising a bladed drum wherein the drum comprises at least one wheel of the subject application.

The component parts of the subject application can reduce the width of the circumferential groove retaining the blades without decreasing the diameter of the lock's clamping screw. This latter can be shortened while maintaining its wedging function as well as its function of showing that it has been correctly installed. The resulting wheel and turbomachine can thus be reduced in both length and weight.

FIG. 1 illustrates a jet engine 2 essentially comprising a nacelle 4 for attaching to the wing or fuselage of an aircraft and a central part housed in the nacelle. Fixing arms 6 connect the central part and the nacelle. The central part essentially comprises a rotor 8 supporting an inlet fan 10, a plurality of blade rows forming the low-pressure compressor 12 and the high-pressure compressor 14. A combustion chamber 16 is located downstream of the high-pressure compressor 14, followed by a turbine 18. This architecture is well known as such to a person skilled in the art and will not be further detailed.

Figure 2:
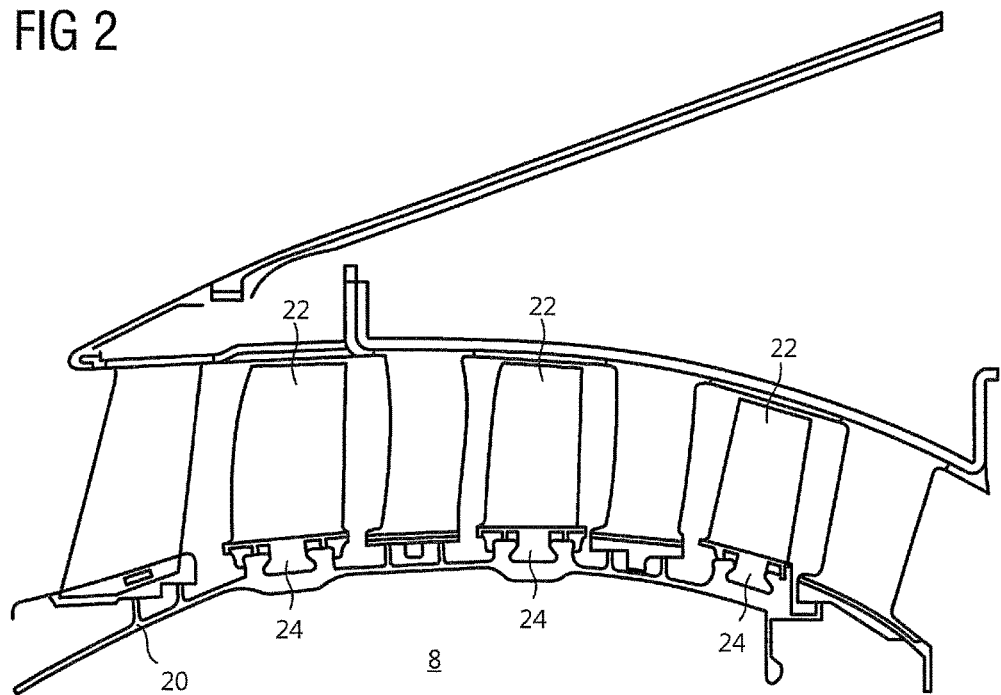
FIG. 2 is a sectional view of a portion of the low-pressure compressor of the turbomachine in FIG. 1, illustrating the rotor in the form of drum and the attachment of the blades into circumferential grooves.

FIG. 2, which is a sectional view of part of the low-pressure compressor of the turbomachine in FIG. 1, illustrating the rotor in the form of drum and the attachment of the rotor blades. It can be seen that the rotor blades 22 include roots 24 housed in respective circumferential grooves for their retention on the drum. This type of arrangement will be further detailed in connection with FIG. 3.

Figure 3:
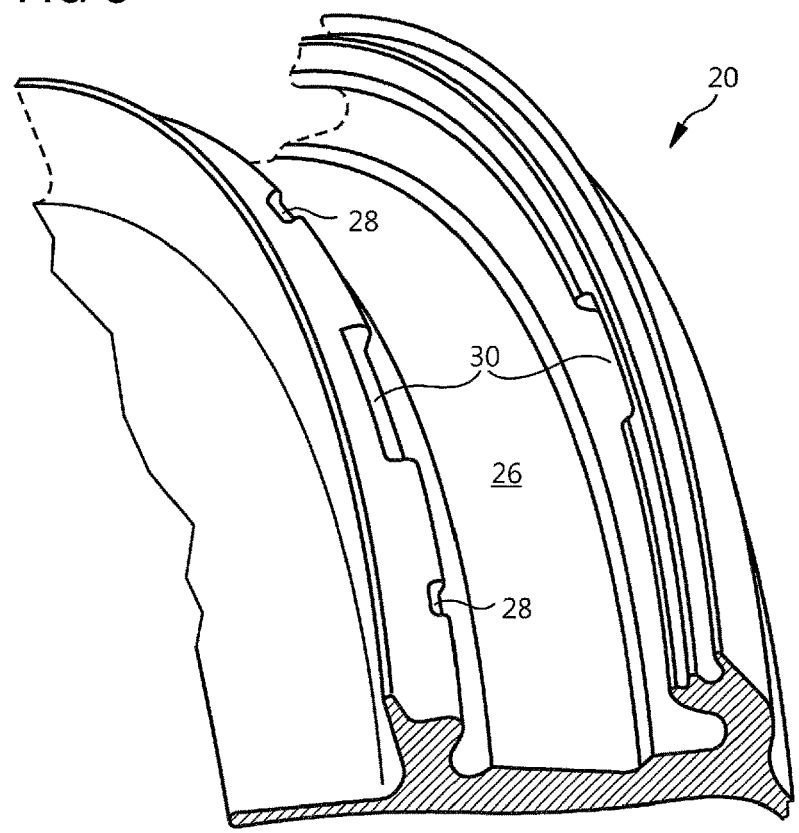
FIG. 3 is a perspective view of a section of the drum with a circumferential groove, designed to form a bladed wheel in accordance with the subject application.

FIG. 3 illustrates part 20 of a compressor drum of the type shown in FIGS. 1 and 2, showing a segment of a groove for attaching a blade row. The groove 26 is circumferential and its opposite edges form between them a cavity suitable for use as contact surface and for retaining the blade roots. Each of the edges includes a slot 30 for inserting the blade roots. These two slots are face to face and configured to permit the successive insertion of each of the blade roots. More particularly, each blade root is initially inserted using an essentially radial movement directed to the bottom of the groove followed by a sliding movement of the root along the groove so as to release space for the insertion for the next blade, and so on.

One or more locks are necessary for clamping the blades circumferentially in the groove. For this purpose, at least one edge comprises at least one slot 28 designed to mate with a lock housed in the groove between two adjacent blade roots. Preferably, and as shown in FIG. 3, at least one edge comprises two slots 28 spaced from each other so as to engage with two locks.

Figure 4:
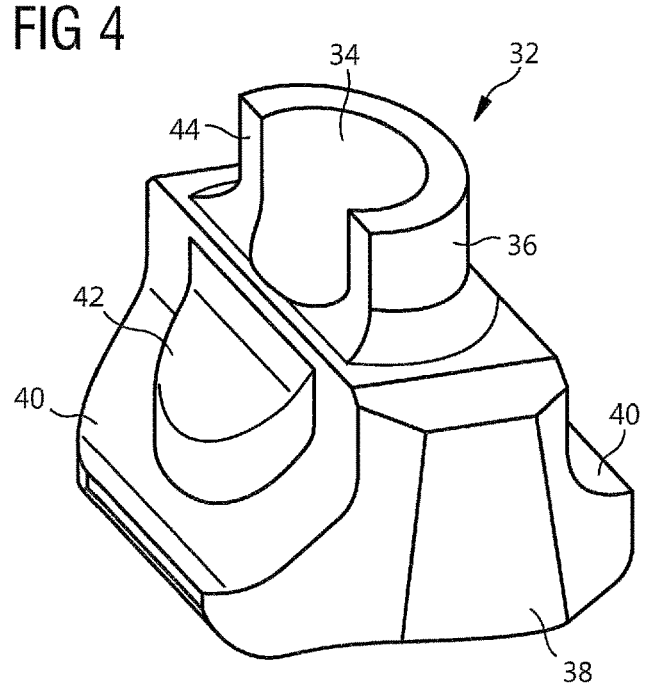
FIG. 4 is a perspective view of a lock in accordance with a first embodiment of the subject application, the lock being designed to be inserted into the groove of FIG. 3.

FIG. 4 illustrates a lock according to the subject application intended to be located in the groove 26 in FIG. 3 and to engage with one of the slots 28. The body 32 of the lock comprises essentially a solid part 38 and an upper cylindrical part 36. The solid part 38 has a profile that in longitudinal section is essentially an inverted T-shape. It comprises two opposed bearing surfaces 40 designed to bear onto the opposite radial and hollow faces of the groove. These surfaces may be symmetric or asymmetric. They each have a profile that is curved or at least partly rectilinear which is inclined relative to the vertical, the slope being designed to enable mechanical engagement with the corresponding surface of the hollow edges of the groove. The average slope may be between 30° and 90°. At least one of these surfaces may also have an average slope of approximately 90°, that is to say a substantially horizontal profile. When the opposing bearing surfaces 40 are asymmetrical, they may have different slopes and/or different lengths and/or be located at different levels relative to the body 32.

At least one of the bearing surfaces 40 may comprise a boss 42 designed to engage with the slot or slots 28 in the groove. The boss 42 may take various forms but is designed to ensure wedging of the lock, and hence the blades, in the circumferential direction of the groove. The lock is designed to be located between two blades when they are fitted in the groove. It is then slid, together with the blades, along the groove until all the blades are housed in the said groove so as to form a complete row. The row is moved by sliding, preferably blade by blade, until the lock is facing its slot. A clamping screw (not visible in FIG. 4) passing through the body of the lock 32 may then be tightened to bear against the bottom of the groove and to raise the lock until its wedging surface 42 engages with the corresponding slot. Thus, the blade row cannot move. The wedging slot in question is located with respect to the insertion slots (30, FIG. 3) so that the blade roots closest to the said slots are, however, at a distance from it so that they are properly anchored in the groove. This then results in the blades being suitably fixed to the drum or rotor.

The cylindrical upper part 36 of the body 32 of the lock has a through hole 34 passing through the body to house a lock clamping screw in the groove. As shown in FIG. 4, the upper cylindrical part 36 is truncated in a generally vertical profile, the truncation being generally transverse to the longitudinal axis aligned with the two bearing surfaces and which may correspond to the rotor's axis of rotation. The truncation 44 of the upper cylindrical part 36 is configured to shorten the length of the said part in the said longitudinal or axial direction. The upper part of the truncated region 44 corresponds to a transverse plane. The lower part corresponds to a surface generated by a straight line moving in parallel along a curved profile. It can be seen that the boundary between the said truncated region 44 and the hole 34 forms a U-shape whose lower part is close to the upper edge of the solid part 38 of the body 32. The upper part of the solid part of the body thus has its length reduced to the maximum extent compared to the truncated cylindrical upper part.

The truncated cylindrical upper part 36 of the body 32 of the lock is designed to be flush with the blade platforms when the lock is fully inserted into the groove and engaged with the wedging slot or slots. Its upper edge serves as a visual indicator of that the lock has been correctly installed. This feature will be further described in connection with the remaining figures.

It should be noted, however, that the cylindrical shape of the upper truncated part is not essential. In fact, this part could have other shapes such as a square or rectangle insofar as it can be, at least partially, pierced by the screw hole and have a generally planar upper surface and fit flush with the upper surfaces of the platforms of the blades adjacent to the lock.

Figure 5:
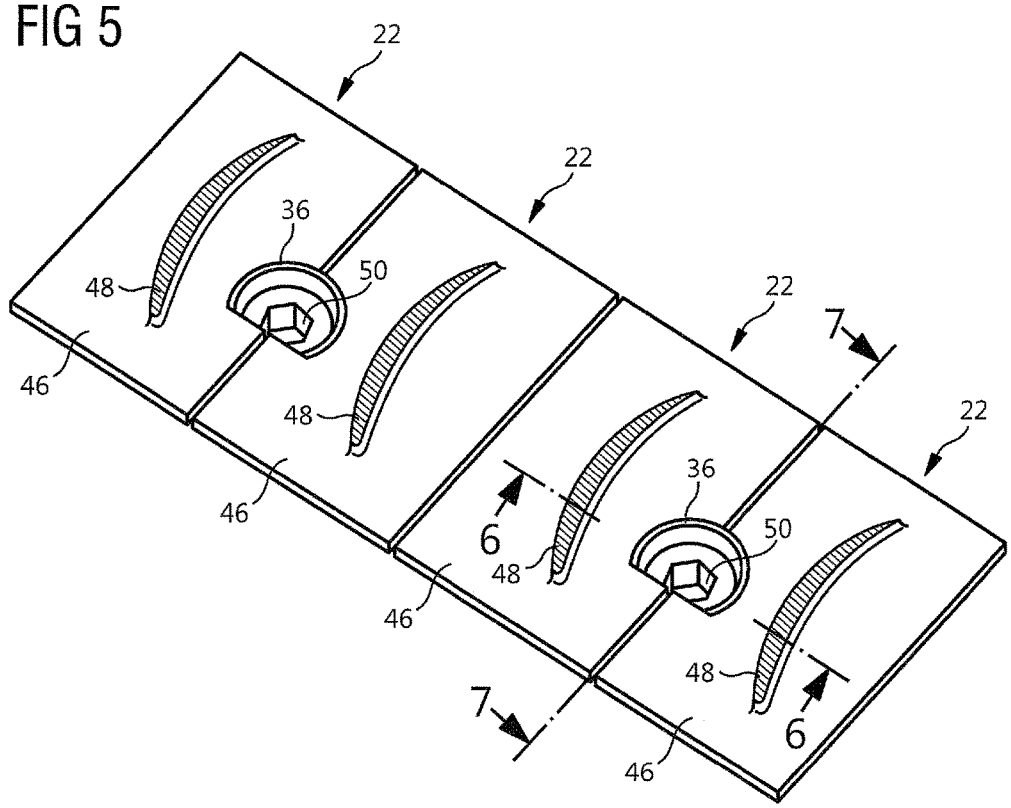
FIG. 5 is a perspective view of a series of blades with their platforms, forming a blade row on the wheel in accordance with the first embodiment of the subject application.

FIG. 5 is a perspective view of a portion of a blade row mounted on a groove such as the one in FIG. 3, the said portion having two locks of the type shown in FIG. 4. The blades 22 each comprise a platform 46. These platforms, when touching or almost touching, form a band covering the groove and forming the inner surface defining the primary flow of the fluid stream through the turbomachine. The aerodynamic parts 48 of the blades 22 are shown cut off close to the platforms to properly demonstrate the elements of the subject application. The two truncated upper parts 36 can be seen, each of the said parts being located between two adjacent blade platforms. There are thus two locks on this blade row. The platforms 46 in question have cut-outs matching the shape of the said visible upper parts of the locks. More specifically, in the case of a truncated cylindrical upper part, each of the platforms 46 matching the said part has a cut-out comprising a first substantially circular portion of 90°, or even up to 100° or 110°, and a second part generally rectilinearly directly connected to the first part and generally perpendicular to the edge of the platform comprising the cut-out.

FIG. 5 also shows the head of the clamping screw 50 in the hole formed in the truncated upper part.

Figure 6:
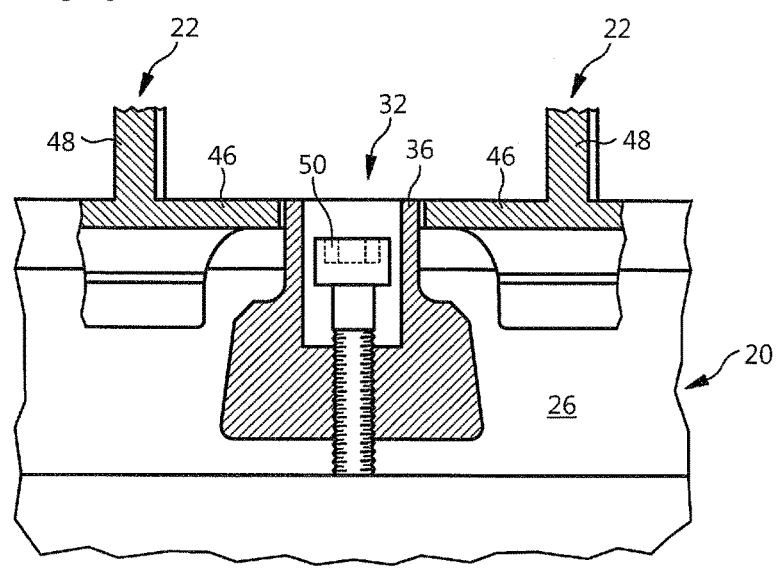
FIG. 6 is a sectional view of FIG. 5, sectioned at 6-6.

FIG. 6 is a sectional view, sectioned along 6-6 in FIG. 5. The truncated cylindrical upper part 36 forms an elongated generally vertical chamber for visually checking the correct mounting of the lock. Its upper edge is level with the upper surfaces of the directly adjacent platforms 46. The screw head 50 is lower than the level of the lower surface of the said platforms as the screw in question is partially located on the platforms, particularly at the right hand edge and perpendicular to the edge of the cut-out of the upper truncated part matching the body of the lock. The end of the screw opposite to the head bears against the bottom of the groove 26. The screw engages with a thread formed preferably directly in the body 32 of the lock.

Figure 7:
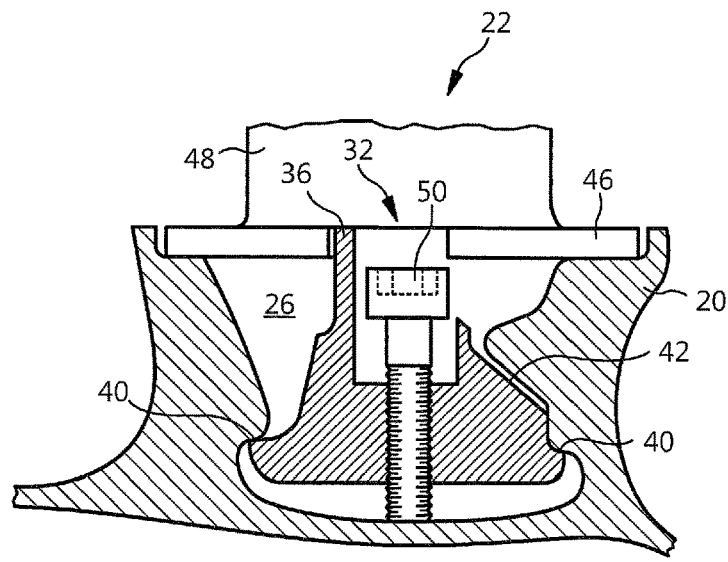
FIG. 7 is a sectional view of FIG. 5, sectioned at 7-7.

FIG. 7 is as sectional view, sectioned along 7-7 in FIG. 5. The truncation of the upper part 36 of the body 32 of the lock is clearly visible. It can also be seen that the screw 50 is partially under the platforms 46 (the parts on the right of the figure), due to the fact that the upper portion of the body is truncated. Access to the screw head from the outside is not always guaranteed. The truncated part (on the left of the figure) of the upper part 36 reliably ensures visual verification that the lock has been properly installed.

In the description that has been made above, the hole and the screw have their axis oriented substantially vertically along a radius of the wheel on which the lock is mounted. However, this axis may in practice be slightly inclined relative to this direction, particularly because of its asymmetrical position in a longitudinal plane. The fact of having truncated the upper part of the body of the lock and thus reducing its length has the consequence that the material thickness of the said part at the lowest point of the truncated region (44, FIG. 4) is substantially less than that of the region opposite.

Figure 8:
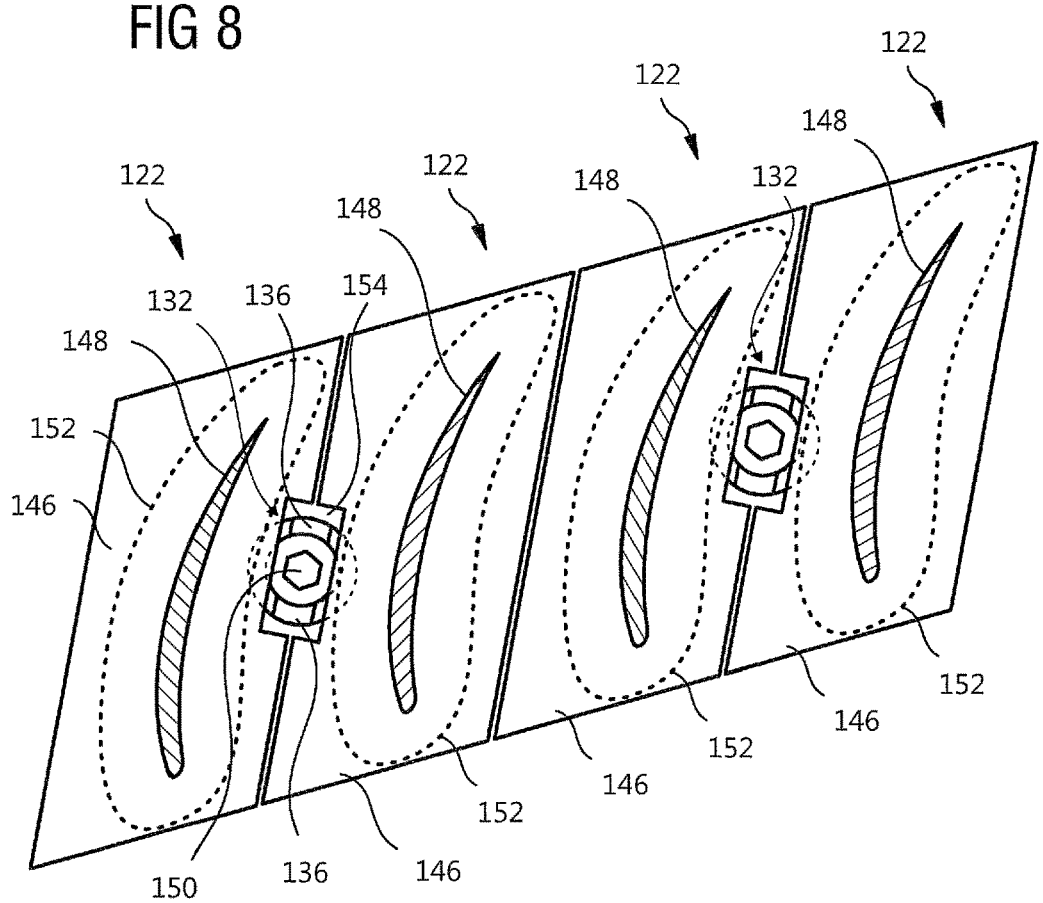
FIG. 8 is a plan view of a series of blades with their platforms, forming a blade row on the wheel in accordance with the second embodiment of the subject application.

FIG. 8 shows a plan view of a portion of a blade row mounted with locks according to a second embodiment of the subject application in a groove such as that shown of FIG. 3. FIG. 8 shows the same numbering as in previous figures for the same or similar items with, however, the numbers being incremented by 100. Specific numbers are used for items specific to this embodiment.

The rotor blades 122 include an airfoil 148 which has a cord sharply angled with respect to the flow. This angle is greater than 5°, preferably greater than 15°, even more preferably greater than 30°. The blades 122 comprise parallelogram-shaped platforms 146 to facilitate fixing the aerodynamic parts 148. For reasons of mechanical strength a perimeter 152 defined on the platform 146 is associated with each blade airfoil 148. This must be maintained so as to ensure a good fit between the blade airfoil 148 and the groove.

The two locks 132 are similar to the one shown in FIG. 4. However, they differ in that in the truncated cylindrical upper part comprises two opposed truncations relative to the cylinder axis. Preferably, the truncations are made using essentially parallel truncation planes, inclined relative to the circumferential direction of the groove seen from above. The truncation planes are essentially parallel to the long sides of the parallelograms forming the platforms 146.

The visible truncated upper cylindrical parts each comprise two arcs 136 housed in openings 154 defined by recesses formed in the edges of the platforms 146 of the blades 122. The apertures 154 are substantially rectangular and aligned with the parallelograms. Their widths allow the clamping screw 150 to be adjusted. According to an advantageous embodiment of the subject application, the upper surfaces of the arcs 136 are flush with the upper surfaces of the platforms 146 and slightly recessed, for example by less than 0.10 mm. Thus, the upper surfaces of arcs 136 may serve as markers for visually checking the correct positioning of the locks, and in particular to check their height in the groove.

The two truncations offer the advantage of complying with the perimeters 152 of the blades 122 without being forced to separate the airfoils 148 one from another while being able to insert a lock between the platforms 146.

The invention claimed is:

1. An axial turbomachine wheel comprising:
   a rotor with at least one circumferential groove having opposed faces, each having a hollow profile;
   blades whose roots are located in, and in mechanical engagement with, the at least one circumferential groove; and
   at least one blade root lock, each of the at least one blade root lock being mounted in one of the at least one circumferential groove between the roots of two adjacent blades preventing the blades sliding along the at least one circumferential groove; and
   each of the at least one blade root lock comprising a body with:
      two opposed bearing surfaces configured to bear radially onto the opposed faces of the at least one circumferential groove;
      a through hole between the two bearing surfaces extending along an axis an upper portion pierced by the hole; and
      a clamping screw housed in the through hole and bearing on the bottom of the at least one circumferential groove;
      wherein the upper portion is truncated, so as to form a contour with a truncated section;
   wherein the two adjacent blades on either side of the at least one blade root lock each comprise a platform on the adjacent edges thereof having cut-outs that match the contour with the truncated section of a corresponding half of the truncated upper portion of the body of the at least one blade root lock; and
   wherein the clamping screw of the at least one blade root lock comprises an upper head for engagement with a tightening tool, with a part thereof that is hidden beneath the two adjacent platforms when viewed from the top, so as to allow a reduction in the length thereof in a plane generally perpendicular to the axis of the hole.

2. The axial turbomachine wheel in accordance with claim 1, wherein each upper portion of the body is truncated, so as to allow a reduction in the length thereof along the width of the at least one circumferential groove and/or in a direction corresponding essentially to the circumferential direction of the at least one circumferential groove.

3. The axial turbomachine wheel in accordance with claim 1, wherein each upper truncated portion of the body is truncated at least on an upper part thereof along a longitudinal plane of the at least one circumferential groove, and on a lower part thereof following a developable surface.

4. The axial turbomachine wheel in accordance with claim 1, wherein each upper truncated portion of the body is truncated on a section thereof between about ¼ and ½ of the outside diameter thereof.

5. The axial turbomachine wheel in accordance with claim 1, wherein each through hole comprises:
   a threaded portion at a distance from an upper edge of the upper truncated portion of the body, such that a head of the clamping screw is disposed at a level below the upper edge, when the clamping screw is engaged in the threaded portion.

6. The axial turbomachine wheel in accordance with claim 1, wherein each body comprises:
   at least one wedge-shaped surface configured to mate with a corresponding slot on one of the opposed faces of the at least one circumferential groove.

7. The axial turbomachine wheel in accordance with claim 1, wherein each clamping screw mates with a thread in the hole of the body, the clamping screw having a head with a diameter larger than the threaded portion of the screw, the screw and the thread of the body being configured, such that the screw is disposed in a position such that the head thereof is embedded in the upper portion of the body to a level beneath that of an upper edge of the body.

8. The axial turbomachine wheel in accordance with claim 1, wherein each body comprises:
   a solid portion having a longitudinal section in the general shape of an inverted T, the upper portion of the body being arranged directly on the said solid portion, and the truncation being limited to the upper portion.

9. The axial turbomachine wheel in accordance with claim 8, wherein the through hole at the truncated part of the upper portion of the body corresponds essentially to a corresponding edge of the solid portion.

10. The axial turbomachine wheel in accordance with claim 1, wherein the longitudinal axis of each through hole is located predominantly on one side of a transverse median plane of the body.

11. The axial turbomachine wheel in accordance with claim 1, wherein each upper portion is cylindrical.

12. The axial turbomachine wheel in accordance with claim 1, wherein a profile of the cut-outs on the platforms includes a first circular part of more than 90° and a second straight part generally perpendicular to an edge of the cut-out.

13. The axial turbomachine wheel in accordance with claim 1, wherein the longitudinal axis of each through hole is substantially included in a median plane of the platforms extending between the adjacent edges.

\* \* \* \* \*